US012649293B2

(12) United States Patent
Cluet et al.

(10) Patent No.: US 12,649,293 B2
(45) Date of Patent: *Jun. 9, 2026

(54) METHOD FOR MANUFACTURING A SEAT CUSHION AND SEAT CUSHION AS SUCH

(71) Applicant: FAURECIA Sièges d'Automobile, Nanterre (FR)

(72) Inventors: Mathieu Cluet, Etampes (FR); Benoît Gazaniol, Arpajon (FR)

(73) Assignees: FAURECIA Sièges d'Automobile, Nanterre (FR); INDORAMA VENTURES MOBILITY OBERNBURG GMBH, Obernbug (DE)

( * ) Notice: Subject to any disclaimer, the term of this patent is extended or adjusted under 35 U.S.C. 154(b) by 129 days.

This patent is subject to a terminal disclaimer.

(21) Appl. No.: 18/239,325

(22) Filed: Aug. 29, 2023

(65) Prior Publication Data

US 2024/0066824 A1 Feb. 29, 2024

(30) Foreign Application Priority Data

Aug. 31, 2022 (FR) ...................................... 2208747

(51) Int. Cl.
  *B29D 99/00* (2010.01)
  *B60N 2/64* (2006.01)
  *D04H 3/16* (2006.01)
(52) U.S. Cl.
  CPC ......... *B29D 99/0092* (2013.01); *B60N 2/646* (2013.01); *D04H 3/16* (2013.01)
(58) Field of Classification Search
  CPC ....... B29D 99/0092; B60N 2/646; D04H 3/16
  See application file for complete search history.

(56) References Cited

U.S. PATENT DOCUMENTS

| | | | | | |
|---|---|---|---|---|---|
| 5,183,708 | A | * | 2/1993 | Yoshida ................... | D04H 1/54 |
| | | | | | 442/364 |
| 9,604,549 | B2 | * | 3/2017 | Makiguchi ............... | B60N 2/70 |
| 12,240,196 | B2 | * | 3/2025 | Cluet ..................... | B60N 2/682 |
| 2007/0086612 | A1 | | 4/2007 | Nishibori | |
| 2013/0020016 | A1 | | 1/2013 | Takaoka | |
| 2024/0066764 | A1 | * | 2/2024 | Cluet ..................... | B29C 43/18 |
| 2024/0399944 | A1 | * | 12/2024 | Cluet ................... | B60N 2/7017 |

FOREIGN PATENT DOCUMENTS

| | | | |
|---|---|---|---|
| DE | 102010006668 | * | 8/2011 |
| JP | 2003250667 A | | 9/2003 |

OTHER PUBLICATIONS

French Search Report for French Priority App. No. FR2208747 dated (Apr. 14, 2023), 8 pages, no English Translation Available.

* cited by examiner

*Primary Examiner* — Philip F Gabler
(74) *Attorney, Agent, or Firm* — Barnes & Thornburg LLP

(57) ABSTRACT

The present disclosure relates to a method for manufacturing a seat cushion comprising: providing a cushion comprising a 3D entanglement of continuous thermoplastic fibers, arranged irregularly or randomly forming loops heat-sealed together and hot-pressing of the 3D entanglement of fibers into one or more local 3D entanglement areas so as to obtain one or more densified, stiffened local areas of the cushion, the local area(s) being configured to serve as a fastening area. The present disclosure also relates to a cushion obtained according to the manufacturing method, and a seat comprising such a cushion and a cap attached to the densified, stiffened local area(s).

8 Claims, 7 Drawing Sheets

METHOD FOR MANUFACTURING A SEAT CUSHION AND SEAT CUSHION AS SUCH

PRIORITY CLAIM

This application claims priority to French Patent Application No. FR2208747, filed Aug. 31, 2022, which is expressly incorporated by reference herein.

BACKGROUND

The present disclosure relates to a method for manufacturing a seat cushion. The present disclosure also relates to a cushion as such able to be obtained by the method according to the present disclosure, as well as a seat comprising such cushion and a cap attached to the cushion in the densified, stiffened local area(s).

SUMMARY

According to the present disclosure, a method for manufacturing a seat cushion is proposed, comprising:
/A/ Providing a cushion comprising a 3D entanglement of continuous thermoplastic fibers, arranged irregularly, for example, randomly, forming loops heat-sealed together,
/B/ Hot-pressing of the 3D entanglement of fibers into one or more local 3D entanglement areas so as to obtain one or more densified, stiffened local areas of the cushion, the local area(s) being configured to serve as a fastening area.

In illustrative embodiments, the step of providing /A/ may comprise:
/A1/ Extrusion of a thermoplastic polymer in an extrusion die comprising extrusion nozzles distributed in a lengthwise direction and along a widthwise direction of the extrusion die, generating a curtain of continuous molten fibers, falling by gravity,
/A2/ Receiving the curtain of continuous molten fibers falling by gravity on one or more support elements with a 3D entanglement of fibers being generated according to an irregular, (e.g, random distribution) with loops melting between the continuous fibers
/A3/ optionally solidifying the 3D entanglement of fibers by immersion in a cooling liquid.

According to one embodiment, the hot pressing in one or more local areas of the cushion leads to a compression by partially reducing the thickness (EP) of the 3D entanglement into the local area, by at least 30% according to the thickness, or even by at least 40%, or even by at least 50%, or even by at least 60%, or even by at least 70%, or even by at least 80%, for example between 80% and 95% or even a total reduction of the entanglement along the thickness According to one embodiment, in /B/ the pressing is a thermoforming step during which a first mold part and a second mold part transform the fibers of the 3D entanglement of the local area into two elastic lips, including:
a first lip adjoining the entanglement at the local area by a first proximal end and has a first free distal end and
a second lip adjoining the entanglement at the local area by a second proximal end and has a second free distal end,
and wherein the first lip and the second lip are oriented towards each other, forming a first snap-fitting part configured to insert a second snap-fitting part into a slot delimited between the first and second distal ends belonging to the first lip and to the second lip.

According to one embodiment, in /B/ the pressing is a thermoforming step during which a first mold part and a second mold part transform the fibers of the entanglement of the local area into a fastening element, such as a tie rod, the fastening element extending transversely to the local area, adjoining the 3D entanglement of thermoplastic fibers by two ends of the fastening element.

According to one embodiment, in /B/, the pressing generates a through-slot along the thickness, from one face of the cushion, to an opposite face.

According to one embodiment, in /B/ the pressing is a thermoforming step partially reducing the thickness of the 3D entanglement by densifying the fibers of the entanglement of the local area, while preserving the 3D entanglement loops heat-sealed together in the local area.

According to one embodiment, the method has all or some of the following features:
the fibers are hollow fibers and/or solid fibers, with a diameter of between 0.2 mm and 2 mm, preferentially between 0.3 mm and 1.5 mm,
the fibers comprise a thermoplastic polymer, the composition of the fibers comprising at least 95% by weight of PET,
and wherein the 3D entanglement of the cushion (5) has an apparent density of between 20 kg/m$^3$ and 70 kg/m$^3$, in particular between 45 kg/m$^3$ and 65 kg/m$^3$ outside the densified, stiffened local area(s).

According to a second aspect, the present disclosure relates to a seat cushion capable of being obtained according to the method according to the present disclosure comprising a 3D entanglement of continuous thermoplastic fibers irregularly arranged, for example, randomly, forming loops heat-sealed together between the fibers, and wherein:
the fibers are hollow fibers and/or solid fibers, in particular with a diameter of between 0.2 mm and 2 mm, preferentially between 0.3 mm and 1.5 mm,
the fibers comprise a thermoplastic polymer, the composition of the fibers comprising at least 95% by weight of PET,
the cushion comprising one or more areas densified and stiffened by hot-pressing the 3D entanglement
and wherein the 3D entanglement of the cushion (5) has an apparent density of between 20 kg/m$^3$ and 70 kg/m$^3$, in particular between 45 kg/m$^3$ and 65 kg/m$^3$ outside the densified, stiffened local area(s) (ZL).

According to a third aspect, the present disclosure relates to a vehicle seat comprising:
a cushion according to the present disclosure
a cap covering the cushion and attached to the cushion in the densified, stiffened local area(s).

According to one embodiment, the seat comprises a cushion comprising, in the local area(s):
a first lip adjoining the entanglement at the local area by a first proximal end and has a first free distal end and
a second lip adjoining the entanglement at the local area by a second proximal end and has a second free distal end
and wherein the first lip and the second lip are oriented towards each other, forming a first snap-fitting part and wherein the cap is attached by a second snap-fitting part elastically inserted into a slot delimited between the first lip and the second lip.

According to one embodiment, the seat comprises a cushion, comprising, in the local area(s), one or more fastening elements, the fastening element extending transversely to the local area, adjoining the 3D entanglement by two ends of the fastening element and wherein the cap is attached by the latching of the fastening element.

According to one embodiment, the seat has a cushion comprising a through-slot along the thickness, from a first face of the cushion, to a second opposite face of the cushion, and wherein the cap is attached by inserting a retaining plate through the cushion from the first face to the second face, or vice versa, then by pivoting the retaining plate so that the plate comes to bear on the second face, on both sides of a mouth of the slot.

According to one embodiment, the seat has a cushion comprising local hot-pressed areas densify the fibers of the entanglement of the local area while preserving the 3D entangled loops heat-sealed together in the local area and wherein the cap is attached via a gripping member, comprising for example a hook assembly, and/or one or more spikes provided with hooks hooking into the loops of the densified, stiffened local area(s).

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

Figure 3:
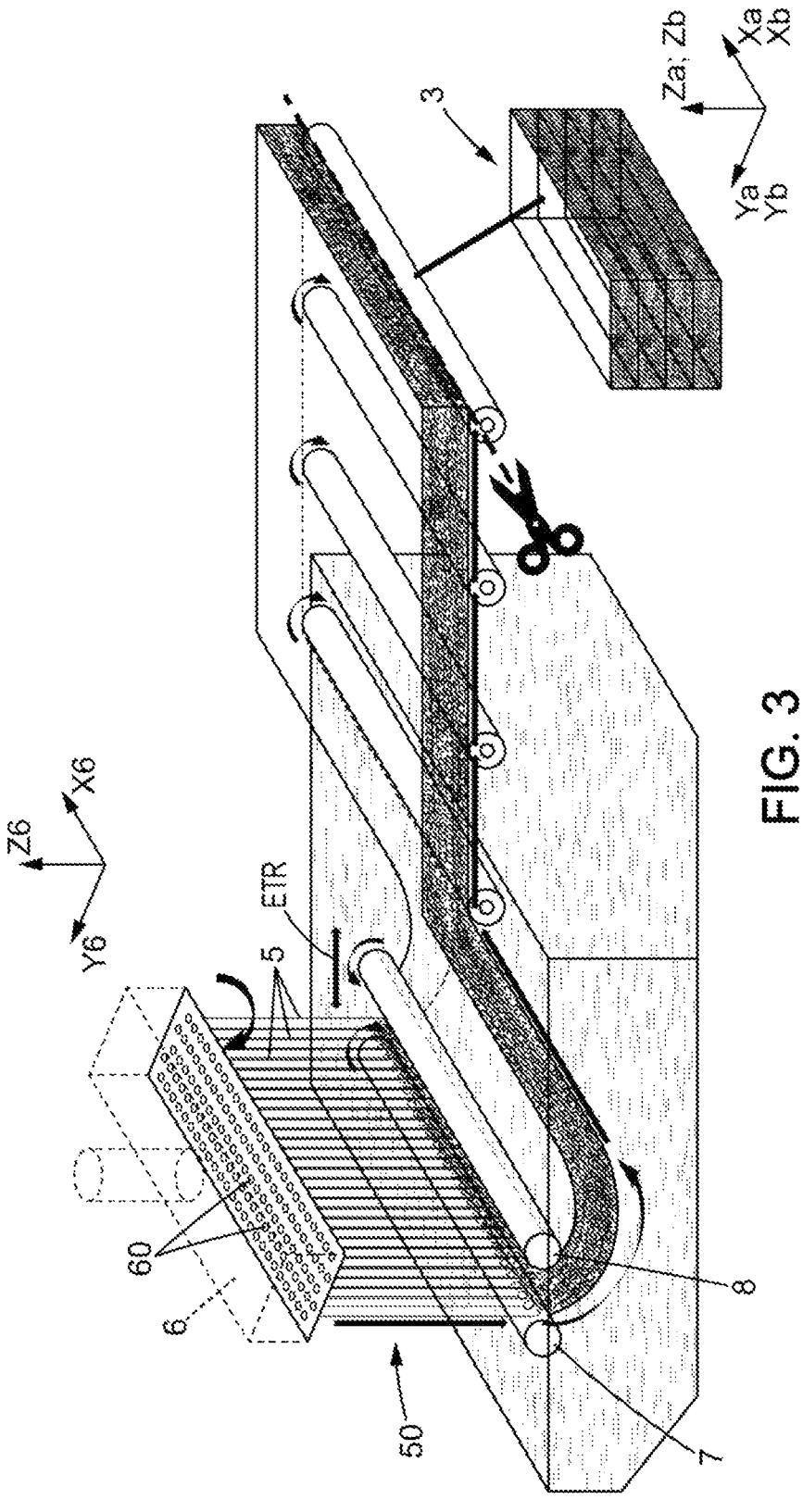

FIG. 3 is a schematic view of the method for manufacturing 3D entanglement comprising extruding a thermoplastic polymer in an extrusion die generating a curtain of continuous molten fibers, falling by gravity, receiving the curtain of continuous molten fibers between two counter-rotating guide members, generating a 3D entanglement of fibers and solidifying the 3D entanglement of fibers by immersion in a cooling liquid, and then obtaining cushion through cuts transverse to the run direction.

Figure 4:
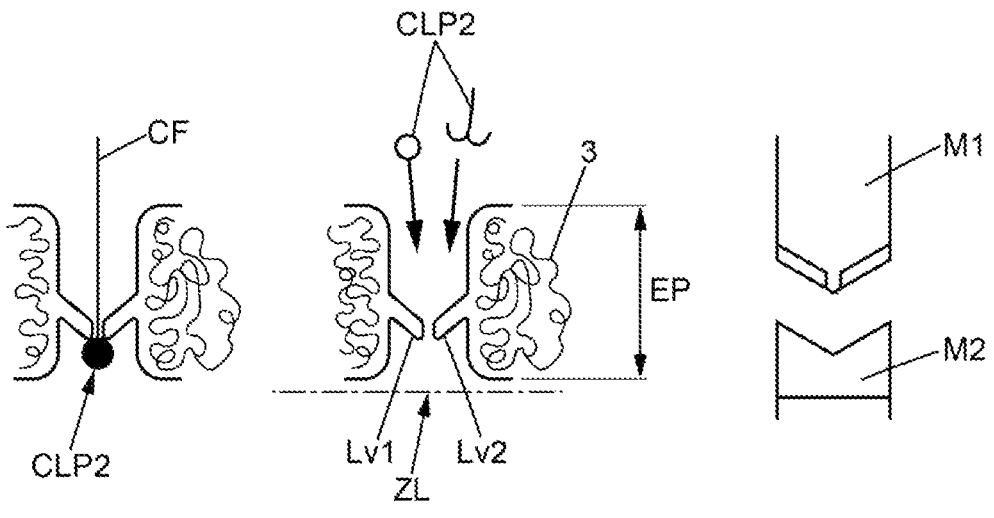

FIG. 4 is a view of a local area of the cushion with a reduction in the thickness and transformation of the fibers of the 3D entanglement into a first lip and a second lip forming a first snap-fitting part, the lips obtained by hot-pressing by the work of a first and of a second mold, on both sides of the cushion, the first snap-fitting part allowing the elastic snap-fitting of a second elastic part between the two lips of the first snap-fitting part.

Figure 5:
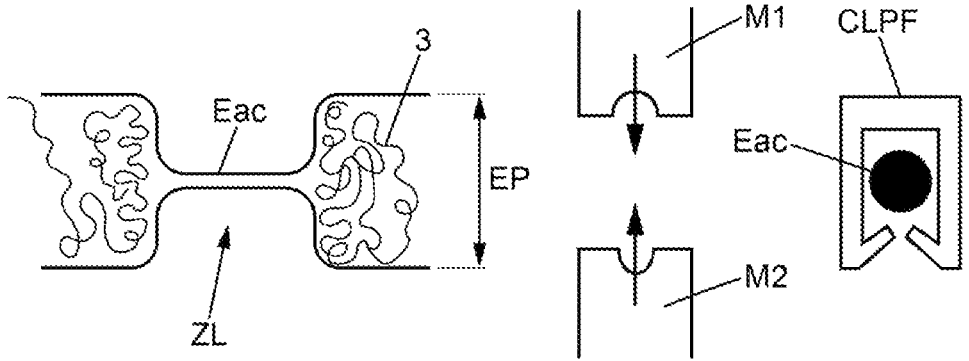

FIG. 5 is a view of a local area of the cushion with reducing the thickness and transformation of the fibers of the 3D entanglement into a fastening element, in the form of a tie rod obtained by hot pressing by the work of a first and a second mold, on both sides of the cushion.

Figure 6:
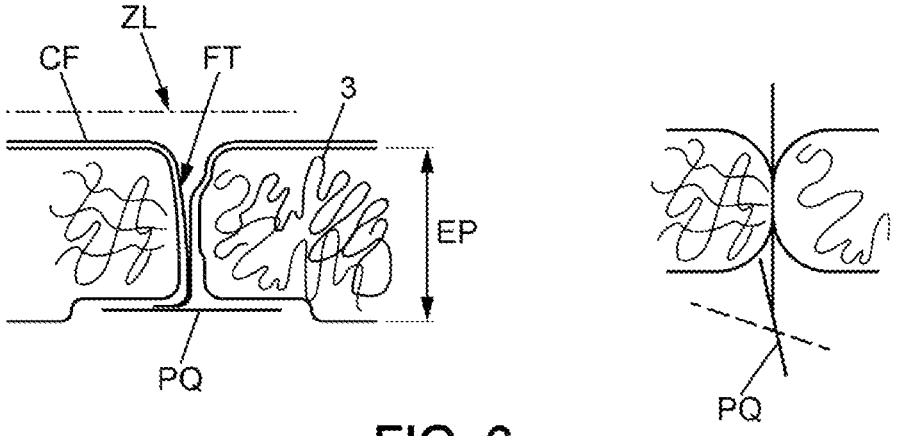

FIG. 6 is a view of a local area of the cushion having a through-slot from a first face of the cushion to a second opposite face, allowing the fastening of a cap by a retaining plate rigidly connected to the cap which is inserted in the slot direction substantially parallel to the slot, then pivoted to bear on the opposite second face of the cushion.

Figures 7, 8:
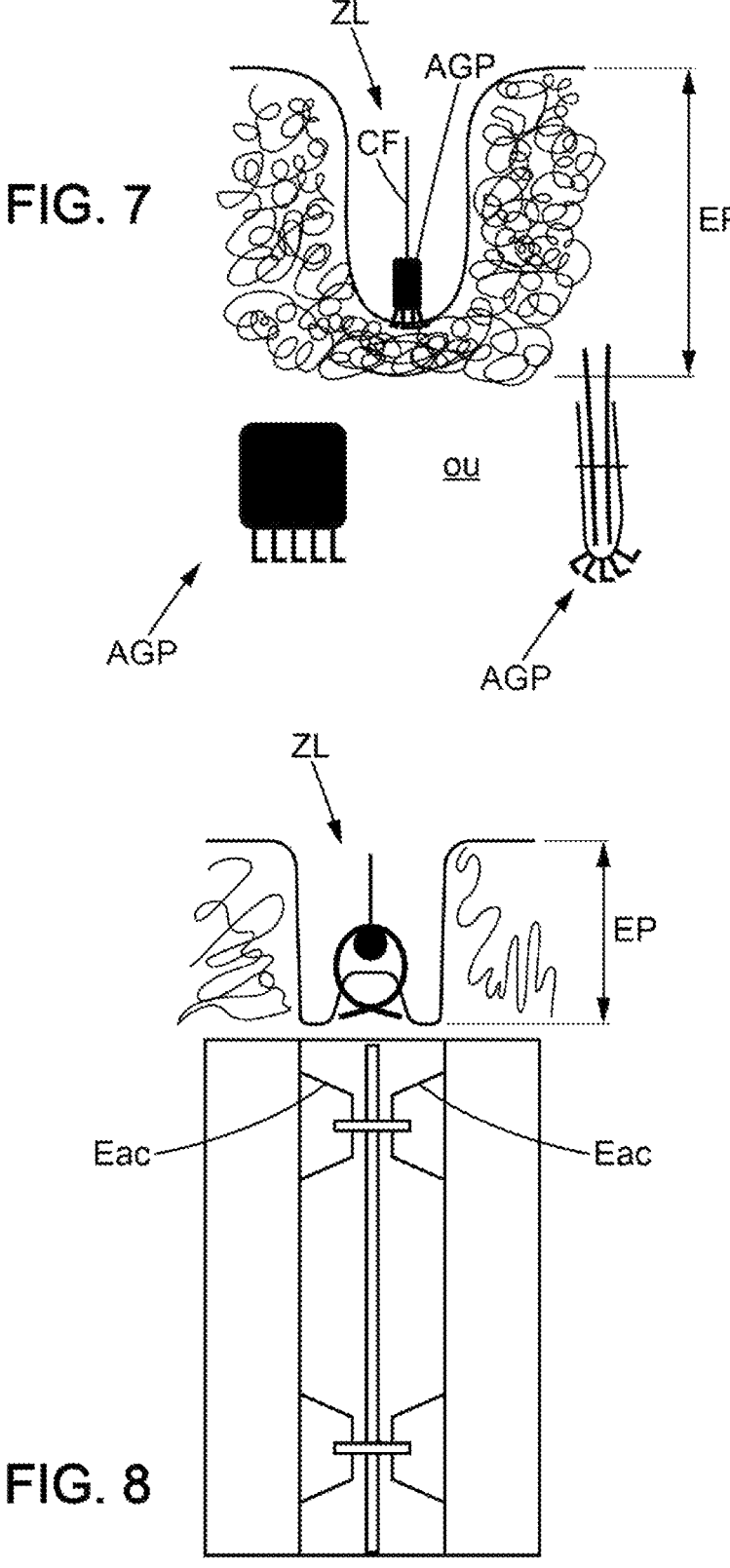

FIG. 7 is a view of a local area with a reduction of the thickness of the cushion and preserving the 3D entanglement loops heat-sealed together in the local area to allow the fastening of gripping elements comprising hooks gripping the loops.

FIG. 8 is a variant of FIG. 5 with transformation of the fibers of the 3D entanglement into several fastening elements, obtained by hot pressing by the work of a first and of a second mold on both sides of the cushion.

Figure 9:
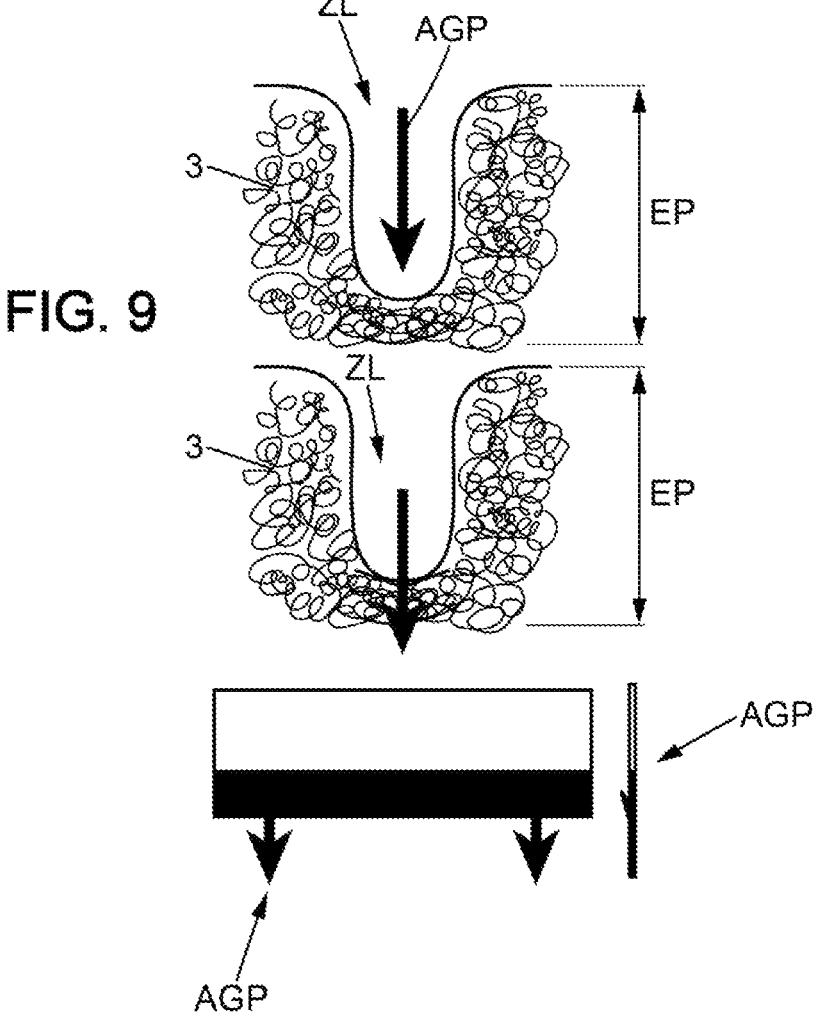

FIG. 9 is a variant of FIG. 7 for which the gripping element comprises a tip provided with hooks, optionally deployable relative to the tip.

Figure 10:
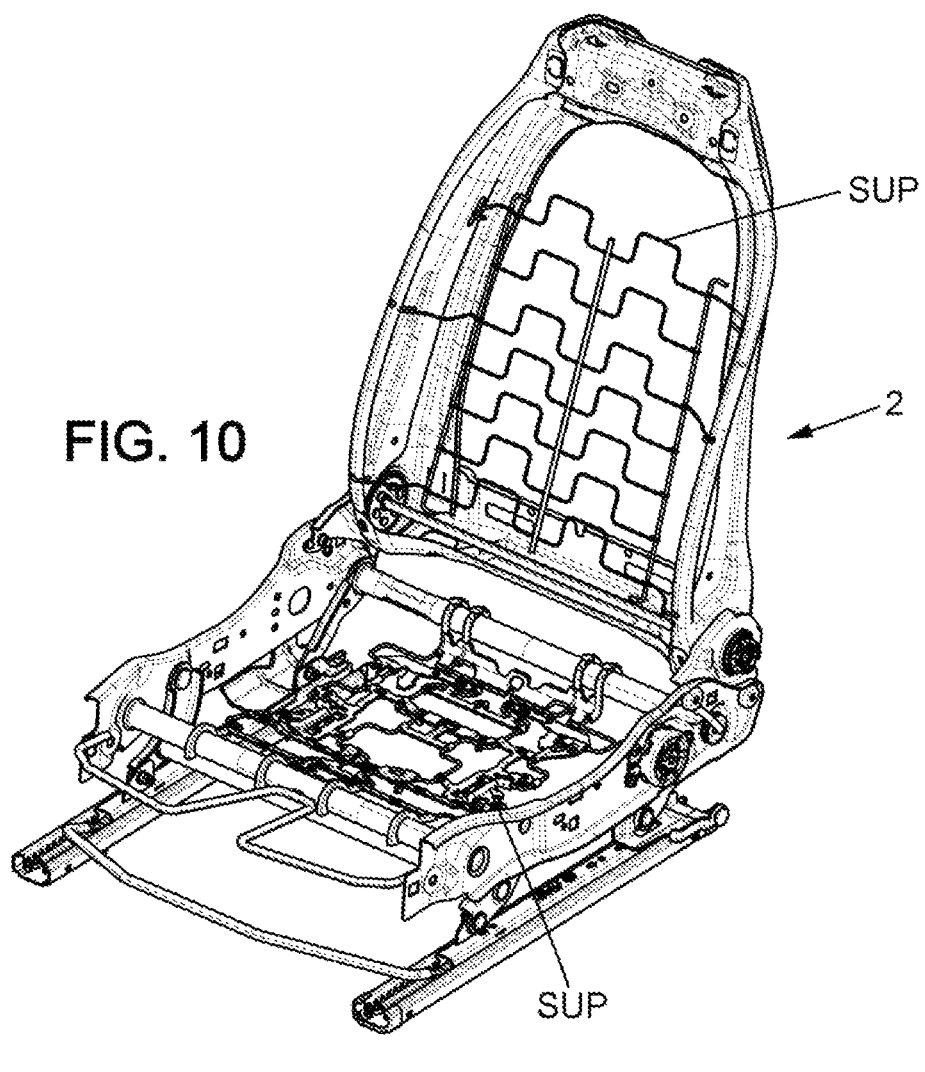

FIG. 10 is a view of a seat according to another embodiment comprising a suspension associated with the squab structure and a suspension associated with the backrest structure.

Figure 11:
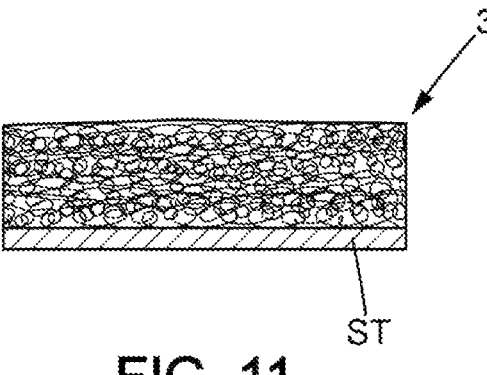

FIG. 11 is a view of an assembly comprising a cushion and a support associated with the cushion.

DETAILED DESCRIPTION

Figure 1:
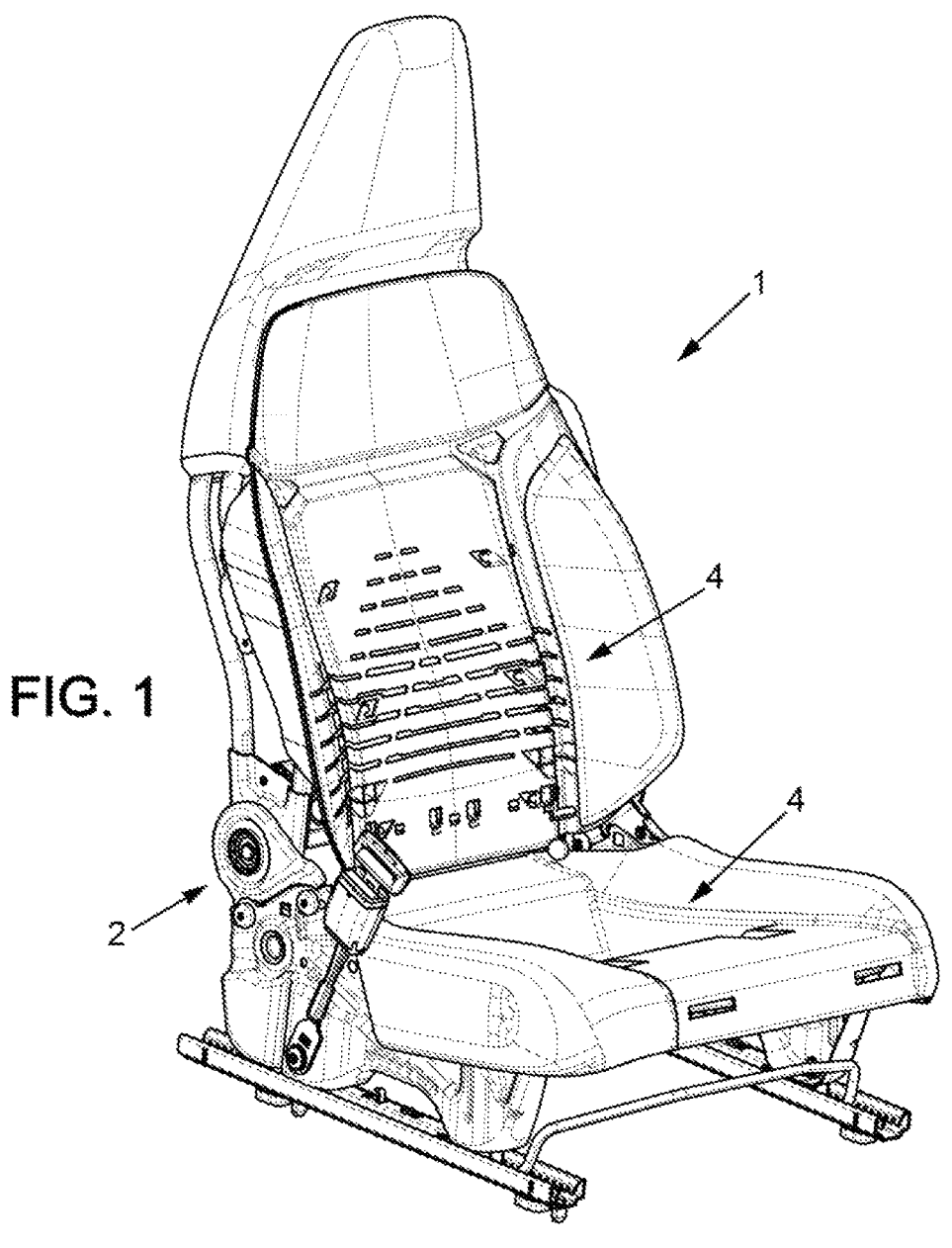
FIG. 1 is a view of a motor vehicle seat, according to one embodiment, showing the metal structure of the seat supporting a plastic backrest interface intended to receive a squab cushion layer and a plastic seat interface, intended to receive a layer of squab cushion, the backrest and squab cushion being not shown.
Figure 2:
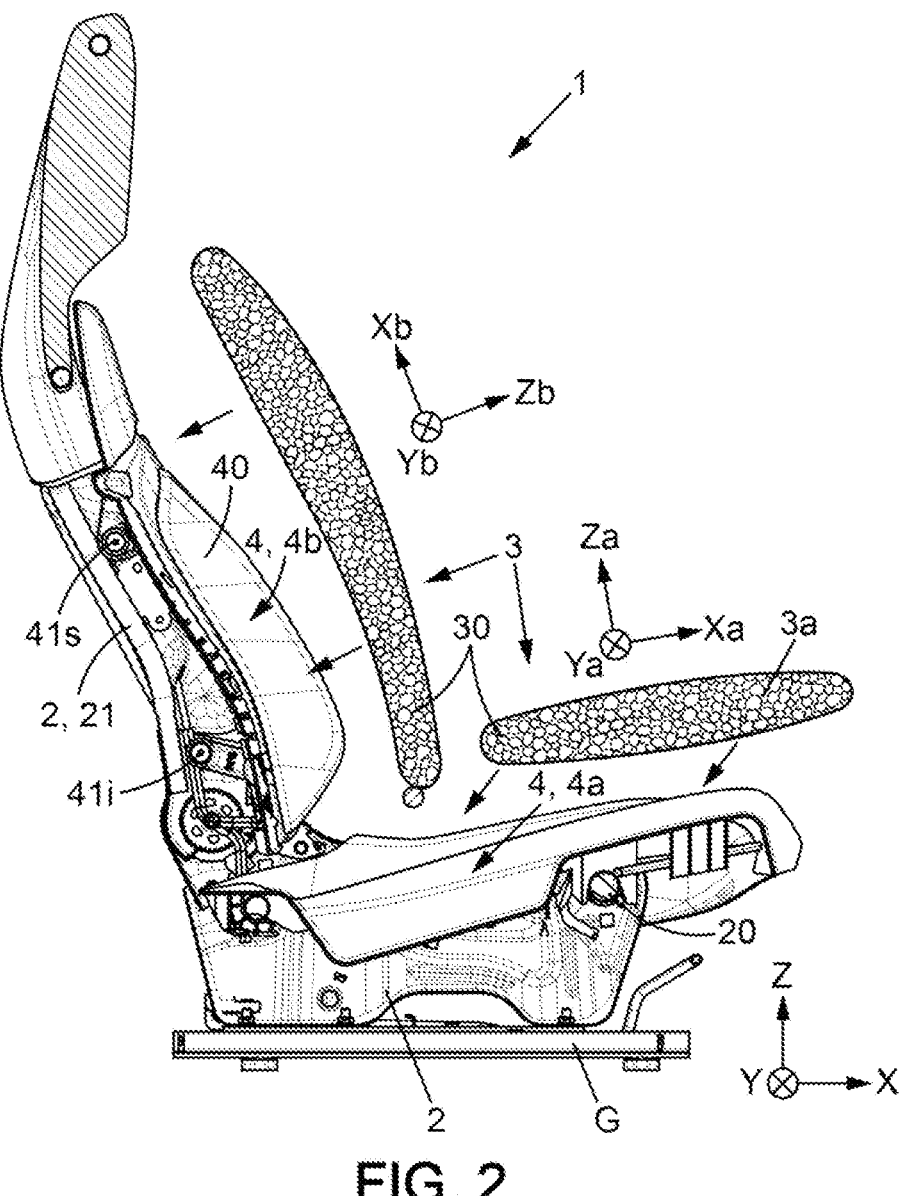
FIG. 2 is a sectional view of the seat of FIG. 1, on which a layer of backrest cushion and a layer of squab cushion are added, according to the present disclosure comprising a random entanglement, in three dimensions (3D) of continuous thermoplastic fibers comprising loops between fibers heat-sealed to one another.

Thus, the present disclosure relates to a seat 1 comprising:
a structure 2, for example, metallic,
a cushion 3.
optionally an interface 4 located between the structure 2 and the cushion 3 and in particular as shown according to the embodiment of FIGS. 1 and 2.

The seat further comprises a cap CF (not shown in FIG. 1) covering the cushion, for example, being attached to the cushion.

In FIG. 2, a reference frame XYZ is shown, the direction X oriented along the sliding direction of the slide G between the squab structure 2 and a floor of the vehicle, the direction Y, oriented along a transverse direction of the seat, and the direction Z along the vertical.

The structure 2, for example, made of metal, comprises a seat frame 20 and a backrest frame 21, for example, articulated around a transverse axis of rotation, for example, by means of articulations of the continuous type.

The squab frame 20, for example, comprises:
two lateral flanges, extending from a rear edge of the backrest and to a front edge, along the direction X, or slightly inclined relative to the longitudinal direction X (for example, by plus or minus 30 degrees) around a transverse axis and,
a front part connecting two front ends of the flanges, and extending in the transverse direction. The front piece and the flanges are, for example, sheets shaped, for example, by stamping techniques.

The backrest frame, for example, comprises lateral uprights, extending height wise, as well as an upper cross-member connecting two upper ends of the uprights. The uprights and the upper cross-member are, for example, shaped sheets, for example by stamping techniques.

The cushion 3, for example, comprises a squab cushion layer 3a which confers the comfort of the seat and which is received on a squab interface 4a inserted between the squab frame 20 and the seat cushion layer 3a and/or the cushion 3, for example, comprises a backrest cushion layer 3b which confers the comfort of the backrest and which is received on a backrest interface 4b which is inserted between the backrest frame 21 and the backrest cushion layer 3b.

The cushion 3, in particular the seat cushion 3a and/or the backrest cushion layer 3b comprises a three-dimensional ("3D") entanglement of continuous, thermoplastic fibers 5 arranged randomly, forming loops heat-sealed together between the fibers 5.

The fibers may be hollow fibers 5a and/or solid fibers 5b. The fibers may have a diameter comprised between 0.2 mm and 2 mm, preferentially between 0.3 mm and 1.5 mm. "Continuous" in "continuous fibers" means that the fibers have a length much greater than the diameter of the fibers, and because of the method which is described below, for example, at least a ratio of 100, or even 500, or even 1000. Very often, and in particular as understandable to the manufacturing method, the fibers, for example, extend from a first end to a first edge of the 3D entanglement and to a second end on a second edge of the entanglement AD, opposite the first edge.

The fibers 5 comprise a thermoplastic polymer, the composition of the fibers preferably comprising at least 95% by weight of PET. For example, the composition of the fibers, or even the cushion comprises:

95% to 99% by weight of a first polymer of the polyester family such as PET (polyethylene terephthalate), 1% to 5% by weight of a second polymer of the family of polyesters, such as PTT (polyethylene terephthalate) or PBT (polybutylene terephthalate). The sum of the PET and of the PTT (or PBT) can be 100% by weight of the fibers, or even of the cushion. The 3D entanglement of the cushion 5 may have an apparent density of between 20 kg/m$^3$ and 70 kg/m$^3$, or even between 45 kg/m$^3$ and 65 kg/m$^3$.

Preferably, the voids between the fibers 5 of the 3D entanglement of fibers 5 of the cushion 3 are left free. A very breathable cushion is obtained, because of the numerous interspaces between the fibers that promote air circulation.

The base cushion layer 3a extends length along a longitudinal direction Xa of the squab from a rear edge to a front edge of the squab, and width along a transverse direction a of the squab from a first lateral edge to a second lateral edge, as well as thickness along an orthogonal direction Za, which is orthogonal to the longitudinal direction and the transverse direction of the squab. The thickness of the layer of squab cushion may be between 60 mm and 100 mm.

The backrest cushion layer 3b extends length along a longitudinal direction Xb of the backrest from a rear edge to a front edge of the backrest, and width along a transverse direction a of the backrest from a first lateral edge to a second lateral edge, as well as thickness along an orthogonal direction Zb, which is orthogonal to the longitudinal direction and to the transverse direction of the backrest. The thickness of the layer of backrest cushion may be between 15 mm and 50 mm.

The interface 4, in particular the squab interface 4a or the backrest interface 4b may comprise a material that is entirely or partially made of plastic. For example, the interface 4 is made of ABS (acrylonitrile butadiene styrene) and/or PC (Polycarbonate) and/or P/E (polypropylene/polyethylene copolymer).

In general, the interface 4, in particular the squab interface 4a or the backrest interface 4b may comprise a shell. The shell may be a molded part or a thermoformed part.

In particular, the backrest interface 4b may comprise:

at least one deformable backrest shell 40, receiving the cushion which is a backrest cushion 3b, the deformable shell 40 being configured to take different shapes in particular from an initial position of lumbar lordosis and in particular to a final position of lumbar kyphosis, in response to a variable load applied by the back of the occupant of the seat, a system coupling the deformable shell 40 to the structure comprising upper movement control links 41s, and lower movement control links 41i.

The upper movement control links 41s and/or the lower movement control links 41i are, for example, articulated links which can comprise connecting rods.

According to another embodiment, the cushion 8, in particular a squab and a backrest can be associated with a seat structure, which comprises, for example, a metallic suspension SUP, in particular as shown in FIG. 10:

a metal suspension, for example, SUP connecting a front spacer and a rear spacer of a squab structure, the spacers connecting a right flange and a left flange of the squab structure, a metal suspension, for example, SUP connecting a right upright and a left upright of a backrest structure.

Also, according to another embodiment, the cushion 3 can be associated with a support ST, for example, preassembled to the cushion, and which in particular allows an assembly to a seat structure, in particular without an interface or suspension.

The present disclosure also relates to a method for manufacturing a seat cushion according to the present disclosure, comprising:

/A/ Providing a cushion 3 comprising a 3D entanglement of continuous 5 thermoplastic fibers, arranged irregularly, for example, randomly, forming loops heat-sealed together, /B/ Hot-pressing of the 3D entanglement of fibers into one or more local 3D entanglement areas so as to obtain one or more densified, stiffened local areas ZL of the cushion. The densified, stiffened local area(s) are configured to serve as a fastening area, advantageously without risk of tearing off the loops of the entanglement and compared to the undensified, stiffened areas.

The step of providing /A/ may comprise, in particular as shown schematically in FIG. 3:

/A1/ Extrusion of a thermoplastic polymer in an extrusion die 6 comprising extrusion nozzles 60 distributed in a lengthwise direction X6 and along a widthwise direction Y6 of the extrusion die, generating a curtain of continuous molten fibers 50, falling by gravity, /A2/ Receiving the curtain of continuous molten fibers falling under gravity on one or more support members, in particular between two counter-rotating guide members 7, 8, with a generation of a 3D entanglement of fibers 5 according to an irregular distribution, for example, random, with melting of the loops between the continuous fibers, in particular according to a layer whose thickness is determined by the center distance ETR between the two counter-rotating members 7, 8

/A3/ Solidification of the 3D entanglement of fibers by immersion in a cooling liquid 9, such as water.

The extrusion nozzles 60 are preferably distributed regularly along the lengthwise direction X6 of the extrusion die, as well as in width along the widthwise direction Y6.

The thickness of the cushion layer formed by the entanglement can be adjusted, by adjusting the center distance between the two guide members 7, 8.

In /A2/, the two guide members 7, 8 are rotated at a speed, for example, lower than the speed of drop of the fibers, providing an accumulation of the fibers at the origin of the formation of loops that heat up between fibers, generating the irregular, random, three-dimensional entanglement. The solidification in /A/ is obtained just after step /B/, the two guide members being able to be immersed at mid-height, for this purpose.

The extrusion temperature implemented in /A/ in the extrusion die is, for example, between 180° and 240° C. The extrusion die is fed with granules of thermoplastic polymer.

The 3D entanglement layer of fibers, continuously running, is then guided, outside the cooling liquid reservoir to be dried, for example, by shaking/vibrations. The running layer is then cut, by transverse cuts, making it possible to obtain different cushion 3, and as can be seen in FIG. 3. These cushions 3 extend lengthwise, for example lengthwise along the longitudinal direction Xa of the squab cushion layer (or in length along the longitudinal direction Xb of the backrest cushion layer), for example, along the direction transverse to the passage of the layer.

According to one embodiment, the apparent density can be homogeneous along the length and width of the layer, and as shown in FIG. 5, at the top. The density of the number of extrusion nozzles is thus homogeneous along the lengthwise direction of the extrusion die.

According to the findings of the inventor, the cushion obtained at the end of the method shown in FIG. 3 generates a cushion with a 3D entanglement of the cushion 5 has an apparent density of between 20 kg/m$^3$ and 70 kg/m$^3$, in particular between 45 kg/m$^3$ and 65 kg/m$^3$ and substantially homogeneously. Such cushion density is configured to provide the comfort and support of the occupant.

According to the applicant, such cushion however has certain limitations: in particular, it is not possible to grip onto the loops of the 3D entanglement of the cushion for example to secure a cap thereto due to the low tearing resistance of the thermoplastic fibers of the 3D entanglement.

Alternatively to the continuous method shown in FIG. 3, a variant can be implemented and wherein the cushion is obtained comprising a 3D entanglement of continuous thermoplastic fibers arranged randomly forming loops heat-sealed together by:

/A1/ Extrusion of a thermoplastic polymer in an extrusion die comprising extrusion nozzles distributed in a lengthwise direction and along a widthwise direction of the extrusion die, generating a curtain of continuous molten fibers, falling by gravity, /A2/ Receiving the curtain of continuous molten fibers falling under gravity into a molding cavity of a molding tool so as to generate a 3D entanglement of fibers according to an irregular, random distribution with loops melting between the continuous fibers /A3/ Solidification of the 3D entanglement of fibers shaped to the cavity for molding by immersion in a cooling liquid.

According to one embodiment, the nozzles are controllable, configured so as to be able to change the shape of the fiber curtain, and wherein a logic processing unit is provided that comprises a control module comprising a microprocessor and a memory comprising instructions for, in /A/, controlling the nozzles so as to generate a curtain of molten fibers, of variable shape during the extrusion along the lengthwise direction and/or the widthwise direction of the extrusion die.

Step /B/ of hot pressing of the 3D entanglement of fibers into one or more local 3D entanglement areas makes it possible to obtain one or more local areas ZL of the densified, stiffened cushion, which make it possible to remedy this problem, avoiding such risks of tearing.

FIGS. 4 to 9 show various embodiments making it possible to obtain densified, stiffened local areas ZL, and which can serve as fastening areas, advantageously without risk of tearing the thermoplastic fibers away from the entanglement.

In general, hot pressing in one or more local areas of the cushion may lead to a partial reduction in the thickness of the 3D entanglement in the local area, at least 30% depending on the cushion thickness, or even at least 40%, or even at least 50%, or even at least 60%, or even at least 70%, or even at least 80%, for example, between 80% and 95%. Such a partial reduction is shown for example in FIGS. 7 and 9. Hot pressing may be achieved by the pressurized work of a first mold M1 and a second mold M2.

Hot pressing can be achieved by carrying the 3D entanglement, at least at the local area(s) at a temperature between 160° C. and 190° C.

Pressing may still lead to a total reduction of the entanglement along the thickness, and as shown in FIG. 4, 5 or 6 or even 7. Such a total reduction along the thickness can lead to a movement of the fibers in the plane, namely according to XY.

According to one embodiment shown as an example in FIG. 4, in /B/ the pressing may be a thermoforming step during which a first mold part M1 and a second mold part M2 transform the fibers of the 3D entanglement of the local area into two elastic lips, including:

a first lip Lv1 adjoining the entanglement at the local area by a first proximal end and has a first free distal end and a second lip Lv2 adjoining the entanglement at the local area by a second proximal end and has a second free distal end.

The first lip Lv1 and the second lip Lv2 are oriented towards each other, forming a first snap-fitting part configured to insert a second snap-fitting part CLP2 into a slot delimited between the first and second distal ends belonging to the first lip Lv1 and to the second lip Lv2 of the first snap-fitting part.

A cap CF may comprise one or a plurality of second snap-fitting parts CLP2 configured to fit into local areas between the two lips Lv1 Lv2 of the first snap-fitting part.

According to one embodiment shown as an example in FIG. 5 or 8, the pressing is a thermoforming step during which a first mold part M1 and a second mold part M2 transform the fibers of the 3D entanglement of the local area into a fastening element Eac, such as a tie rod, the fastening element extending transversely to the local area, adjoining the 3D entanglement by two ends of the fastening element Eac.

A cap CF may comprise a female snap-fit CLPF into which the fastening element Eac elastically engages.

According to one embodiment shown by way of example in FIG. 6, in /B/, the pressing generates a through-slot FT according to the thickness of the cushion, from a first face of the cushion, to a second opposite face. The cap can be attached by inserting a retaining plate PQ through the slot of the cushion from the first face to the second face (or vice versa). The plate is inserted through the through-slot FT by orienting the retaining plate parallel to the through slot FT.

Once the retaining plate PQ has passed through the cushion, locking can be achieved by pivoting the retaining plate PQ substantially 90°, then substantially perpendicular to the slot, so that the retaining plate comes to bear on the second face (or the first face) on both sides of a mouth of the slot.

According to one embodiment shown by way of example in FIG. 7 or 9, in /B/ the pressing is a thermoforming step partially reducing the thickness of the 3D entanglement by densifying the fibers of the entanglement of the local area, while preserving the 3D entanglement loops heat-sealed together in the local area ZL.

The cap may be attached by means of a grasping member AGP, comprising for example a set of hooks (FIG. 7), and/or spikes provided with hooks (FIG. 9) hooking the loops of the densified local area. The gripping members can be gripping to the loops of the entanglement, without risk of tearing, due to the densification obtained by hot pressing.

The present disclosure further relates to a seat cushion capable of being obtained according to the method of the present disclosure comprising a 3D entanglement of continuous thermoplastic fibers irregularly arranged, for example, randomly, forming loops heat-sealed together between the fibers, and wherein:

the fibers 5 are hollow fibers and/or solid fibers, in particular with a diameter of between 0.2 mm and 2 mm, preferentially between 0.3 mm and 1.5 mm, the fibers 5 comprise a thermoplastic polymer, the composition of the fibers comprising at least 95% by weight of PET.

According to the present disclosure, the cushion comprising one or more areas densified and stiffened by hot-pressing the 3D entanglement.

The 3D entanglement of the cushion 3 may have an apparent density of between 20 kg/m$^3$ and 70 kg/m$^3$ in particular between 45 kg/m$^3$ and 65 kg/m$^3$ with the exception of the local areas that may exhibit a higher density.

The present disclosure relates to a vehicle seat comprising:

a cushion 3 according to the present disclosure a cap 9 covering the cushion and attached to the cushion in the densified, stiffened local area(s) ZL.

According to one embodiment, the cushion 3 may comprise in the local area(s):

a first lip Lv1 adjoining the entanglement at the local area ZL by a first proximal end and has a first free distal end and a second lip Lv2 adjoining the entanglement at the local area ZL by a second proximal end and has a second free distal end.

The first lip Lv1 and the second lip Lv2 are oriented towards each other, forming a first snap-fitting part and the cap is attached by a second clip-fastening part CLP2 inserted elastically into a slot delimited between the first lip and the second lip, and according to FIG. 4.

According to one embodiment, the cushion 3 may comprise, in the local area(s), one or more fastening elements Eac, the fastening element Eac extending transversely to the local area, being adjoining the 3D entanglement by two ends of the fastening element and wherein the cap is attached by fastening the fastening element Eac, for example by using a female snap-fitting CLPF and according to FIG. 4 or 8.

According to one embodiment, the cushion 3 may comprise a through-slot FT along the thickness, from a first face of the cushion, to a second opposite face of the cushion. The cap is attached by inserting a retaining plate PQ through the cushion from the first face to the second face, or vice versa, then by pivoting the retaining plate PQ so that the plate comes to bear on the second face (or the first face), on both sides of a mouth of the through-slot FT, and as shown in FIG. 6.

The cushion may comprise hot-pressed local areas that densify the fibers of the entanglement of the local area while preserving the 3D entanglement loops heat-sealed together in the local area. The cap CF can be attached via a gripping member AGP, comprising for example as a set of hooks, and/or a tip provided with hook(s) engaging the loops of the densified local area, and as shown in FIG. 7 or 9. The hook(s) associated with the tip can be deployable to promote fastening, once the tip is inserted into the loops of the 3D entanglement.

The present disclosure relates to the field of motor vehicle seats which comprise, for example, a metal structure, for example, with a squab frame and a backrest frame. The structure may be obtained by stamping techniques. The seats further comprise cushions, including a layer of squab cushion and a layer of backrest cushion that impart the softness of the squab and the backrest, and participate in comfort in the seat. These cushions are covered by caps covering the cushions and which can be, for example, attached to fastening inserts, internal to the cushion.

The comparative squab and backrest cushions may be made of foam of urethane polymer, and shaped in molds. The polyurethane cushion may be covered with a cap, fastening inserts being used to fasten the cap are trapped within the foam, by overmolding. The comparative polyurethane foam cushions are satisfactory, but may in wet condition, retain moisture.

The present disclosure relates to the field of motor vehicle seats. Comparative motor vehicle seats may comprise, for example, a metal structure, with a squab frame and a backrest frame. The structure may be obtained by stamping techniques. The comparative seats further comprise cushions, including a layer of squab cushion and a layer of backrest cushion that impart the softness of the squab and the backrest, and participate in comfort in the seat. These cushions are covered by caps covering the cushions and which can be attached to fastening inserts, internal to the cushion.

The comparative squab and backrest cushions may be made of foam of urethane polymer, and shaped in molds. The polyurethane cushion may be covered with a cap, fastening inserts being used to fasten the cap are trapped within the foam, by overmolding. The comparative polyurethane foam cushions are satisfactory, but may in wet condition, retain moisture.

The present disclosure improves the situation.

The invention claimed is:

1. A method for manufacturing a seat cushion comprising:

providing a cushion comprising a 3D entanglement of continuous thermoplastic fibers, arranged irregularly, forming loops that are heat-sealed to one another, and hot-pressing of the 3D entanglement of fibers into one or more local 3D entanglement areas so as to obtain one or more densified, stiffened local areas of the cushion that are denser and stiffer than the other area of the cushion, the local area(s) being configured to serve as a fastening area.

2. The method of claim 1, wherein the providing step includes:

extruding a thermoplastic polymer in an extrusion die comprising extrusion nozzles distributed in a lengthwise direction and along a widthwise direction of the extrusion die, generating a curtain of continuous molten fibers, falling by gravity, receiving the curtain of continuous molten fibers falling by gravity on one or more support elements with a 3D entanglement of fibers being generated according to an irregular distribution with loops melting between the continuous fibers, and/or solidifying the 3D entanglement of fibers by immersion in a cooling liquid.

3. The method of claim 1, wherein the hot pressing in one or more local areas of the cushion leads to a compression by partially reducing the thickness of the 3D entanglement into the local area, by at least 30% according to the thickness.

4. The method of claim 1, wherein in the pressing is a thermoforming step during which a first mold part and a second mold part transform the fibers of the 3D entanglement of the local area into two elastic lips, including:

a first lip adjoining the entanglement at the local area by a first proximal end and has a first free distal end and a second lip adjoining the entanglement at the local area by a second proximal end and has a second free distal end, and wherein the first lip and the second lip are oriented towards each other, forming a first snap-fitting part configured to insert a second snap-fitting part into a slot delimited between the first and second distal ends belonging to the first lip and to the second lip.

5. The method of claim 1, wherein in the pressing is a thermoforming step during which a first mold part and a second mold part transform the fibers of the entanglement of the local area into a fastening element, such as a tie rod, the fastening element extending transversely to the local area, adjoining the 3D entanglement of thermoplastic fibers by two ends of the fastening element.

6. The method of claim 1, wherein in, the pressing generates a through slot along the thickness, from one face of the cushion, to an opposite face.

7. The method of claim 1, wherein in the pressing is a thermoforming step partially reducing the thickness of the 3D entanglement by densifying the fibers of the entanglement of the local area with preservation of the 3D entanglement loops heat-sealed together in the local area.

8. The method of claim 1, having all or some of the following features the fibers are hollow fibers and/or solid fibers, with a diameter of between 0.2 mm and 2 mm, the fibers comprise a thermoplastic polymer, the composition of the fibers comprising at least 95% by weight of PET, and wherein the 3D entanglement of the cushion has an apparent density of between 45 kg/m$^3$ and 65 kg/m$^3$ on said other area that is less dense and less stiff than the densified, stiffened local areas.

* * * * *